UNITED STATES PATENT OFFICE.

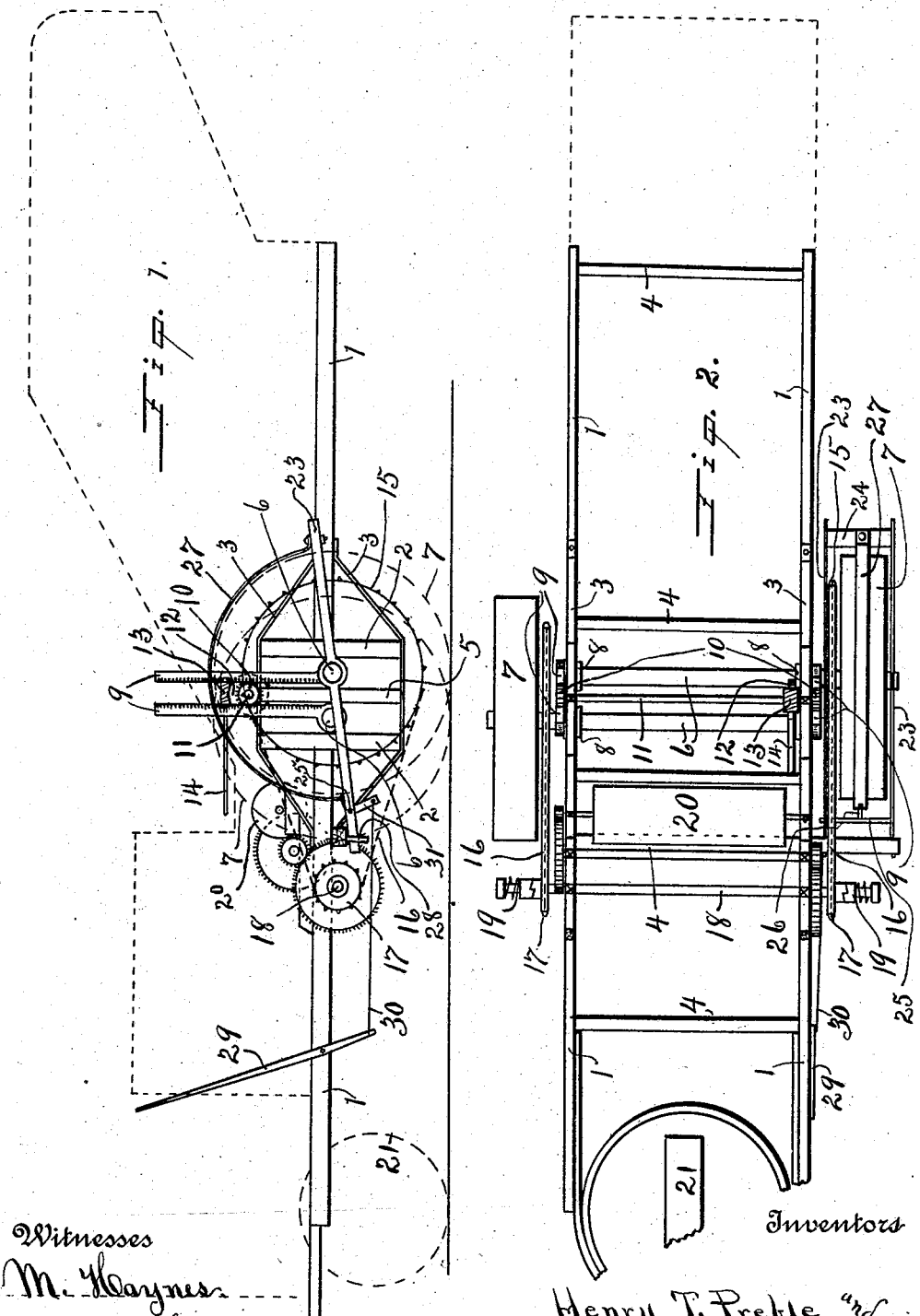

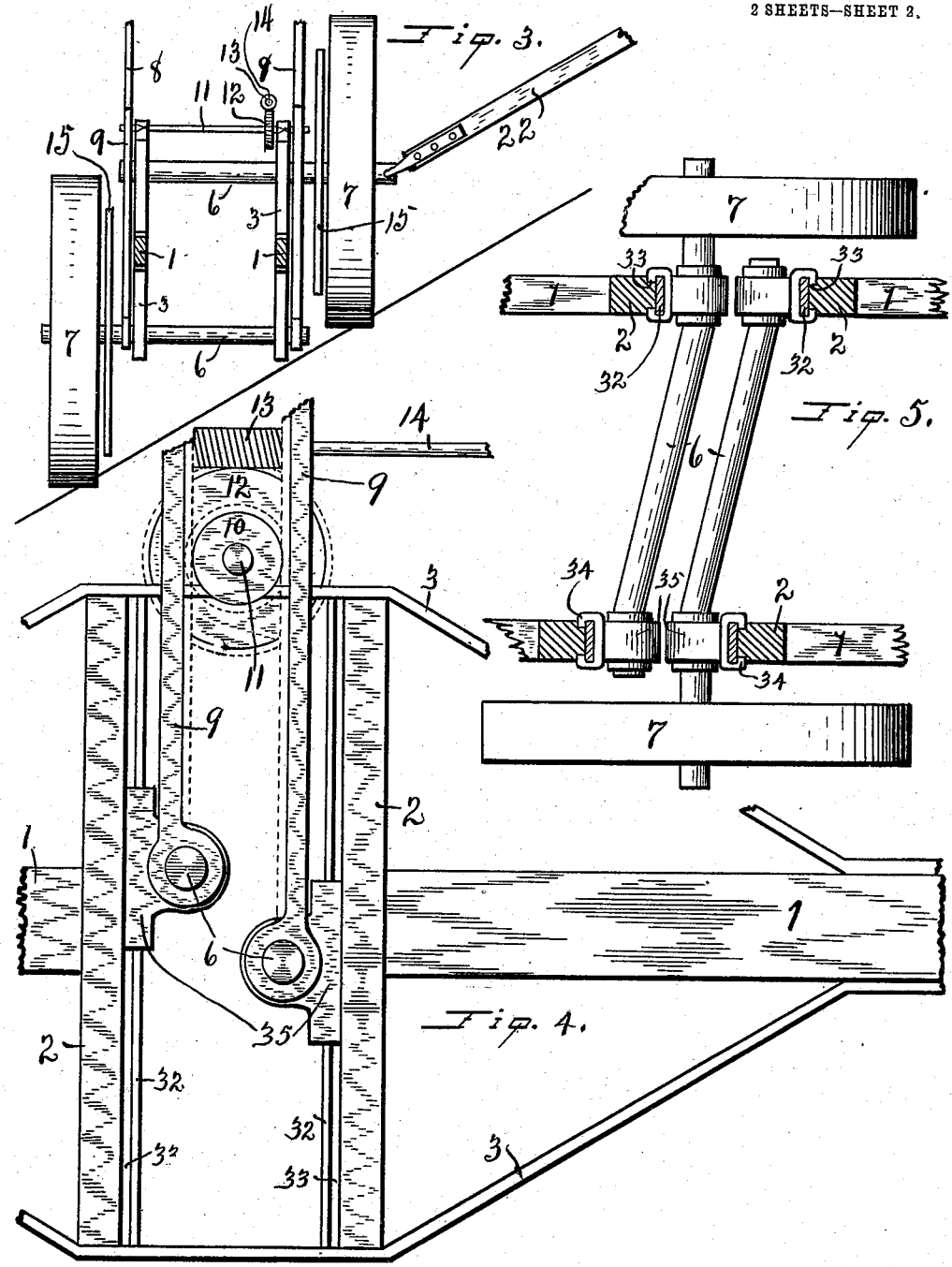

HENRY T. PREBLE AND JOHN W. PAYNE, OF STOCKTON, CALIFORNIA; SAID PAYNE ASSIGNOR TO SAID PREBLE.

TILTING SIDEHILL-HARVESTER.

No. 899,432.     Specification of Letters Patent.     Patented Sept. 22, 1908.

Application filed December 17, 1906. Serial No. 348,337.

*To all whom it may concern:*

Be it known that we, HENRY T. PREBLE and JOHN W. PAYNE, citizens of the United States, residing at Stockton, in the county of San Joaquin and State of California, have invented new and useful Improvements in Tilting Sidehill-Harvesters, of which the following is a specification.

This invention relates to improvements in traction vehicles and more particularly to what is known as side hill harvesters.

The invention consists of the novel construction and arrangement of the traction gear; whereby the bed of the vehicle can be maintained on a substantially level plane irrespective of the grade or topographical condition of the ground over which the vehicle is traveling.

The object of the invention is to provide a simple, strong, durable and effective means for varying the horizontal plane of the traction wheels relative to each other and the main frame, by means of a synchronous vertical adjustment.

Harvesters designed to operate on level ground fail to operate satisfactorily upon hill sides for reasons well known to those skilled in the art. Suffice it to say, that it has been found necessary to maintain the threshing mechanism upon a level plane laterally, to insure uniform results. To prevent the wheels from sliding it is essential that their vertical position be maintained.

In the drawings: Figure 1 is a side elevation of a vehicle frame constructed in accordance with this invention; the outlines of the harvester or the driving mechanism being indicated in dotted lines. Fig. 2 is a plan view from above of the same. Fig. 3 is an end elevation from behind the same, showing the traction gear in the extreme vertical adjustment on a hillside. Fig. 4 is a fragmentary detail in side elevation of a modified method of guiding the vertical movement of the traction wheel axles. Fig. 5 is a fragmentary detail in plan from above, showing a modification in the form of the traction wheel axles, whereby the wheels are set in alinement across the machine.

Broadly the invention consists of mounting the traction or driving wheels of the harvester on two distinct axles set athwart the main frame and guiding said axles vertically on both sides of the frame and supporting them by rackbars enmeshed on opposite sides of pinions fixed upon a shaft extending across and mounted upon the frame of the machine and adapted to be rotated to cause a synchronous rise and fall of the rackbars enmeshed on opposite sides of the pinions.

In detail the construction consists of the side beams #1 of the main frame, which are divided and joined to the upright beams #2, and rigidly held in position by the trusses #3, and the thwart beams #4. The upright beam #5 fixed between the trusses acts as a center guide for the axles #6, upon which the traction wheels #7 are loosely mounted outside the main frame. The axles are guided between the uprights #2 and #5, the attendant friction being neutralized by the rollers #8, supported by the rackbars #9, which engage opposite sides of the pinions #10 fixed upon the shaft #11, journaled in boxes fixed upon the main frame. The shaft #11 is rotated by a worm gear #12 enmeshed with a worm #13 on the shaft #14 which extends to within easy reach and control of the operator.

The power is transmitted from the traction wheels #7 by means of the sprocket wheels #15 fixed thereon, through the sprocket chains #16 to the clutch sprockets #17 loosely mounted upon each end of the countershaft #18. These clutch sprockets are normally in constant engagement with a ratchet member #19 splined on the outer end of the countershaft and held in engagement by expansion springs acting against a fixed collar on the end of the countershaft. The function of these clutches is to insure a constant drive forward in rounding curves, when the traction wheels are differentiating. The cylinder #20 and the other threshing mechanisms derive their power from the countershaft #18 through a train of gears in any approved manner. In applying the invention for traction engine purposes the countershaft #18 is geared to the motive power which is mounted upon the frame in the most advantageous position, when it is desired to combine the harvester and the tractor. It is obvious, however, that the two machines may be independent and coupled together in the approved manner common to locomotive and train.

The front of the machine is supported and steered by the wheel #21, suitably mounted. The header frame #22 is mounted to one side of the harvester and operates in the usual manner. The brake mechanism provided upon one or both of the traction wheels consists of the side bars #23 mounted loosely on the main axles #6, and joined in the rear by the cross brace #24, and in front depended from an outrigger #28 from the main frame in such a manner as to allow for radial movement as the main axles are raised and lowered. The rockershaft #25 journaled between the bars #23 carries the fixed lever #26 to which the brake band #27 is pivoted at its front end, its rear end being fixed to the cross brace #24. The brake lever #29 pivoted to the side of the frame is linked to the lever #31 by the connecting rod #30, whereby the brake band can be tightened about the traction wheels at will.

Various modifications may be made in the construction without departing materially from the spirit of our invention. For instance in Figs. 4 and 5 is shown a modification in the manner of guiding and mounting the traction wheels. The center guide bar #5 is eliminated and the guide plates #32 fixed to the faces of the upright beams #2 substituted therefor. The rollers #8 are superseded by the sliding carriages #35 engaging the plates #32, the lips #34 sliding within the grooves #33 in the beams #2. To bring the wheels in alinement across the main frame the axles are offset as shown in Fig. 5. Other obvious modifications may be made in the power transmitting mechanisms and in the raising and lowering mechanisms; such as curving the axle guides #2 on a radius from the shaft #18.

We are aware that sidehill harvesters have been constructed with leveling mechanisms, in which the wheels were mounted in independent frames hinged to the main frame; therefore we make no claim of novelty for this feature.

The invention is operated as follows: When traveling on level ground the axle centers are set in the mid position. If traveling across a gradient higher on the right side the pinion #13 is rotated in the backward direction which will cause the rack bars, upon which the right wheel is mounted, to ascend and the rack bars, upon which the left wheel is mounted, to descend with relation to the main frame, to the necessary extent to maintain the horizontal position of the vehicle bed. The parallelism of the axles is maintained, consequently the vehicle center of the respective wheels is not disturbed. Should the gradient be higher on the left the pinion would be rotated in the opposite direction to bring about a reverse result.

Description of the harvesting mechanism not being germane to the invention is omitted. The construction shown being simple, and light is adaptable to an "all steel" construction and very desirable in this class of machinery.

Having thus described our invention, what we claim and desire to secure by Letters Patent is:

1. A vehicle having its traction wheels mounted upon axles set athwart the main frame thereof; vertical axle guides on both sides of said frame; rack bars fixed to said axles, a shaft extending across said main frame; pinions carried by said shaft and meshing with said rack bars, means for rotating said pinions, whereby said axles simultaneously move in opposite directions and maintain their parallelism with the said main frame; power transmitting mechanisms between said traction wheels and the power shaft.

2. A vehicle having its traction wheels mounted upon axles set athwart the main frame thereof; vertical axle guides upon both sides of said frame; rack bars fixed to said axles, a shaft extending across said main frame, pinions carried by said shaft and meshing with said rack bars and means for rotating said pinions.

3. A side hill harvester comprising a frame, axles extending transversely across said frame, traction wheels thereon, vertically arranged axle guides upon both sides of said frame engaging said axles, and means for simultaneously adjusting said axles in opposite directions in said guides.

4. A vehicle of the character described comprising a frame, axles extending transversely across said frame, traction wheels on said axles, and means for simultaneously effecting a vertical adjustment of said axles in opposite directions.

In testimony whereof we have affixed our signatures to this specification in the presence of two witnesses.

HENRY T. PREBLE.
JOHN W. PAYNE.

Witnesses:
MOLBRY HAYNES,
A. H. CARPENTER.